US008886775B2

(12) United States Patent
Asati et al.

(10) Patent No.: US 8,886,775 B2
(45) Date of Patent: Nov. 11, 2014

(54) DYNAMIC LEARNING BY A SERVER IN A NETWORK ENVIRONMENT

(75) Inventors: Rajiv Asati, Research Triangle Park, NC (US); Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 283 days.

(21) Appl. No.: 13/414,986

(22) Filed: Mar. 8, 2012

(65) Prior Publication Data

US 2013/0238769 A1    Sep. 12, 2013

(51) Int. Cl.
*G06F 15/173* (2006.01)

(52) U.S. Cl.
USPC ........... 709/220; 709/221; 709/222; 709/223; 709/224; 370/257; 370/392

(58) Field of Classification Search
USPC ......................... 709/220–224; 370/257, 392
See application file for complete search history.

(56) References Cited

U.S. PATENT DOCUMENTS

| 7,388,829 | B2 | 6/2008 | Sivakumar et al. | |
|---|---|---|---|---|
| 7,529,926 | B2 * | 5/2009 | Oishi | 713/156 |
| 7,710,967 | B2 * | 5/2010 | Popoviciu et al. | 370/392 |
| 7,756,984 | B2 | 7/2010 | Burr et al. | |
| 7,853,721 | B2 | 12/2010 | Awadallah et al. | |
| 8,209,748 | B1 | 6/2012 | Nordstrom et al. | |
| 2006/0104226 | A1 | 5/2006 | Ahn | |
| 2006/0215654 | A1 | 9/2006 | Sivakumar et al. | |
| 2008/0052758 | A1 | 2/2008 | Byrnesq | |
| 2008/0259925 | A1 * | 10/2008 | Droms et al. | 370/392 |
| 2010/0215019 | A1 * | 8/2010 | Velev et al. | 370/331 |
| 2010/0316019 | A1 * | 12/2010 | Liu et al. | 370/331 |
| 2011/0004674 | A1 * | 1/2011 | Zheng | 709/220 |
| 2011/0202670 | A1 | 8/2011 | Zheng | |
| 2012/0179790 | A1 | 7/2012 | Kim et al. | |
| 2012/0311693 | A1 | 12/2012 | Horman et al. | |
| 2013/0067043 | A1 * | 3/2013 | Gaitonde et al. | 709/220 |

FOREIGN PATENT DOCUMENTS

EP    2493117 A1 *   8/2012

OTHER PUBLICATIONS

U.S. Appl. No. 13/155,358, filed Jun. 7, 2011 entitled "Dynamically Determining Hostnames of Network Devices," Inventors: Rajiv Asati, et al.
T. Narten, et al., "Privacy Extensions for Stateless Address Autoconfiguration in IPv6," Jan. 2001, Network Working Group, RFC 3041, 17 pages; http://www.ietf.org/rfc/rfc3041.txt.pdf.
R. Droms, et al., "Dynamic Host Configuration Protocol for IPv6 (DHCPv6)," Jul. 2003, Network Working Group, RFC 3315, 101 pages; http://www.ietf.org/rfc/rfc3315.txt.pdf.

(Continued)

*Primary Examiner* — Ario Etienne
*Assistant Examiner* — Kidest Mendaye
(74) *Attorney, Agent, or Firm* — Patent Capital Group (57) ABSTRACT

In one embodiment, receiving a neighbor solicitation message from a stateless address configuration host; processing the neighbor solicitation message to obtain a device identifier and an internet protocol version six (IPv6) address; storing a mapping between the device identifier and the IPv6 address in a database associated with the network device; and sending the mapping in a new message to a server. In more particular embodiments, the method can include evaluating the database in order to determine whether a particular IPv6 address is a duplicate; and marking an entry associated with the particular IPv6 address in the database for deletion.

35 Claims, 8 Drawing Sheets

(56) References Cited

OTHER PUBLICATIONS

R. Droms, Stateless Dynamic Host Configuration Protocol (DHCP) Service for IPv6, Apr. 2004, Network Working Group, RFC 3736, 9 pages; http://www.ietf.org/rfc/rfc3736.txt.pdf.

S. Thomson, et al., "IPv6 Stateless Address Autoconfiguration," Sep. 2007, Network Working Group, RFC 4862, 30 pages; http://www.ietf.org/rfc/rfc4862.txt.pdf.

J. Jeong, et al., "IPv6 Router Advertisement Option for DNS Configuration," Sep. 2007, Network Working Group, RFC 5006, 12 pages; http://www.ietf.org/rfc/rfc5006.txt.pdf.

J. Jeong, et al., "IPv6 Router Advertisement Option for DNS Configuration," Nov. 2010, Network Working Group, RFC 6106, 19 pages; http://www.ietf.org/rfc/rfc6106.txt.pdf.

Ray Soucy, "IPv6 Deployment for the LAN," Oct. 18, 2009, 3 pages; http://mailman.nanog.org/pipermail/nanog/2009-October/014229.html.

Gossamer Threads, "SLAAC(autoconfig) vs DHCPv6," Aug. 18, 2008, 22 pages; http://www.gossamer-threads.com/lists/nanog/users/107652.

E. Nordmark, "FCFS-SAVI: First-Come First-Serve Source-Address Validation for Locally Assigned Addresses," Network Working Group, Internet-Draft, Jul. 12, 2010, 29 pages; http://tools.ietf.org/html/draft-ietf-savi-fcfs-04.

Erik Nordmark, "SAVI thoughts," <No draft>, [retrieved and printed Mar. 2, 2012], 9 pages; http://www.ietf.org/proceedings/72/slides/savi-5.pdf.

E. Nordmark, et al., "First-Come First-Serve Source-Address Validation Implementation," Network Working Group, Internet-Draft, Jan. 22, 2009, 15 pages; http://tools.ietf.org/html/draft-bagnulo-savi-fcfs.

USPTO Jun. 14, 2014 Non-Final Office Action from U.S. Appl. No. 13/155,358.

USPTO Apr. 4, 2013 Non-Final Office Action from U.S. Appl. No. 13/155,358.

USPTO Aug. 13, 2013 Final Office Action from U.S. Appl. No. 13/155,358.

* cited by examiner

DYNAMIC LEARNING BY A SERVER IN A NETWORK ENVIRONMENT

TECHNICAL FIELD

This disclosure relates in general to the field of communications and, more particularly, to providing dynamic learning by a server in a network environment.

BACKGROUND

Internet Protocol version six (IPv6) is a version of the Internet Protocol developed by the Internet Engineering Task Force (IETF) that is designed to eventually replace Internet Protocol version four (IPv4). IPv6 includes many enhancements to the Internet Protocol (IP), including a much larger address space and improved routing protocols in an IP network. Devices that are connected to IP networks need to be configured before they can communicate with other devices. Part of the configuration includes information such as an IP address.

Stateless Auto Address Configuration (SLAAC) is one of the ways to assign one or more IPv6 address to the devices. SLAAC involves one or more routers to advertise one or more IPv6 prefixes that each host device can use to calculate and self-assign one or more IPv6 addresses. This results in a device management system being oblivious to the IPv6 addresses used by the host devices. Accordingly, this presents a significant challenge to network operators and, in many cases, makes SLAAC an unfavorable option.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving a neighbor solicitation message from a stateless address configuration host; processing the neighbor solicitation message to obtain a device identifier and an internet protocol version six (IPv6) address; storing a mapping between the device identifier and the IPv6 address in a database associated with the network device; and sending the mapping in a new message to a server.

In more particular embodiments, the method can include evaluating the database in order to determine whether a particular IPv6 address is a duplicate; and marking an entry associated with the particular IPv6 address in the database for deletion. Note that the broad terms 'deletion' and 'purging' are synonymous, as used herein in this Specification. The method could also include sending a message with a lifetime setting of zero (e.g., in a particular packet formatting) along with a particular IP address to the server to purge the particular IP address from the server. In more detailed examples, the method can include determining that the device identifier is the same as a particular identifier stored in the database; determining that the IPv6 address is not the same as a particular IP address stored in the database; determining that a prefix for the IPv6 address is not the same for the particular IP address stored in the database; and appending the IPv6 address to the particular IP address stored in the database.

In other cases, if a prefix for the IPv6 address is the same for the particular IP address stored in the database, the method can include replacing the particular IP address stored in the database with the IPv6 address. Other implementations can include storing the device identifier and the IPv6 address in the database; determining that an entry in the database has changed; and sending the entry that has changed to a dynamic host configuration protocol (DHCP) server. More specifically, the IPv6 address can be generated using prefix information from a router advertisement message, and a neighbor solicitation (NS) message is sent to a next network location in order to store the IPv6 address.

In other example embodiments potentially involving a server, a method is provided that can include receiving a message at a Dynamic Host Configuration Protocol (DHCP) server that includes a mapping between a device identifier and an Internet Protocol version six (IPv6) address, where the message is associated with a stateless address configuration host and storing the mapping between the device identifier and the IPv6 address at the DHCP server. The method could also include tracking usage statistics associated with a plurality of stateless address configuration hosts, where for each of the plurality of stateless address configuration hosts, a respective mapping between a particular device identifier and a particular IPv6 address is stored.

A neighbor solicitation message from the stateless address configuration host can be used to obtain the device identifier and the IPv6 address. The neighbor solicitation message can be sent via a router that received the neighbor solicitation message from the stateless address configuration host.

In other example implementations, the method can include receiving an unsolicited message from a particular router and evaluating the unsolicited message for one or more DHCP options associated with a particular mapping for a particular IPv6 address. In other instances, the method can include removing the IPv6 address from the DHCP server when the message includes a lifetime setting of zero within a particular packet. The method can also include evaluating a particular IPv6 address in order to determine whether it is a duplicate and marking an entry associated with the particular IPv6 address for deletion.

Example Embodiments

Figure 1:
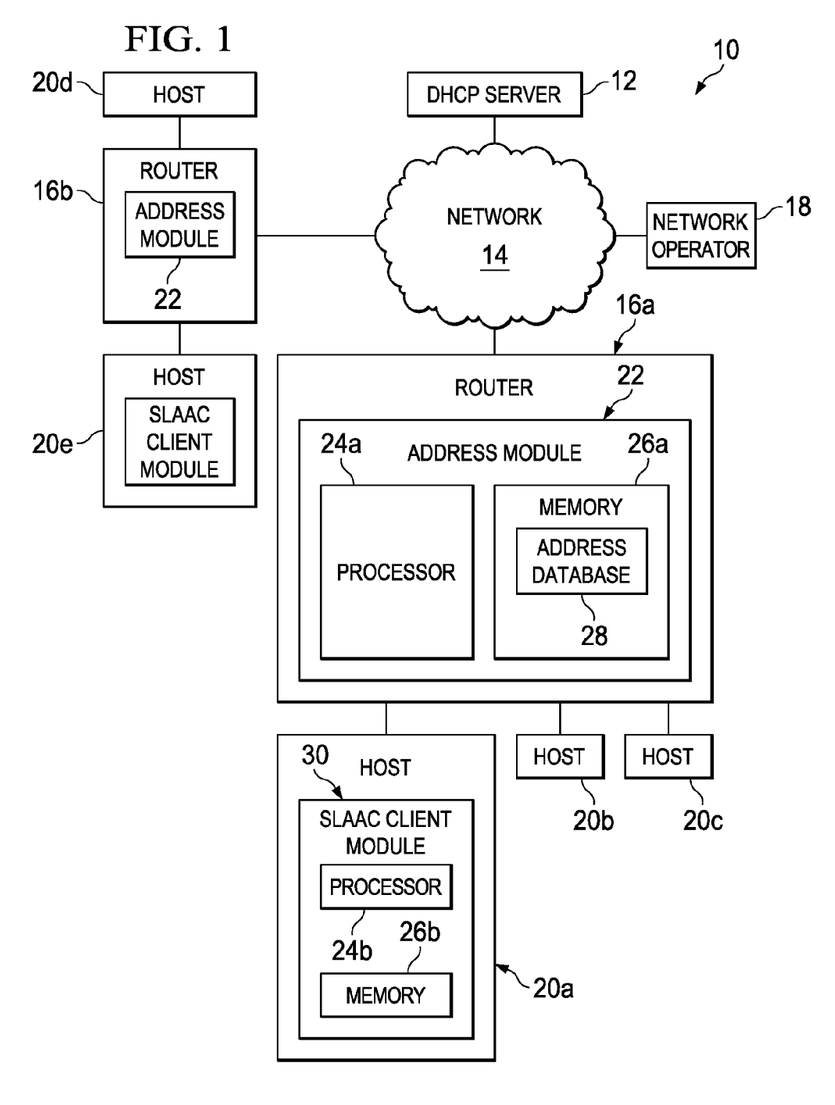
FIG. 1 is a simplified block diagram of a communication system for providing dynamic learning by a server in a network environment in accordance with one embodiment of the present disclosure.

Turning to FIG. 1, FIG. 1 is a simplified block diagram of a communication system 10 for providing dynamic learning by a server in a network environment in accordance with one embodiment of the present disclosure. FIG. 1 includes a DHCP server 12, a network 14, a plurality of routers 16a and 16b, a network operator 18, and a plurality of hosts 20a-e. Router 16a and 16b may each include an instance of an address module 22. Address module 22 may include a processor 24a and a memory 26a, which may include an address database 28. One or more hosts 20a-e may each include a stateless address auto configuration (SLAAC) client module 30. SLAAC client module 30 includes a processor 24b and a memory 26b. In a particular embodiment, router 16a is a bridge or switch. In an embodiment, network operator 18 may be a service provider that offers various services to one or more end users (e.g., hosts 20a-e).

In one particular instance, communication system 10 may be configured to enhance Dynamic Host Configuration Protocol version six (DHCPv6) in Internet Protocol version six (IPv6) by using a new message/option that a router (e.g., router 16a) can use to convey mappings (e.g., IPv6 addresses and device identifiers) pertaining to SLAAC clients (e.g., hosts 20a-c). These mappings may be provided to any given network location (e.g., provided to DHCP server 12). In one example, a router maintains a local database (e.g., address database 28) for SLAAC clients associated with the router and sends the database information to servers (e.g., DHCP server 12 or backend device management systems) for tracking and monitoring usage. In an embodiment, the configuration may make use of existing protocols and messages without any changes to a client (i.e., host) OS implementation, or to an IPv6 Neighbor discovery protocol. The framework of communication system 10 can provide a server (e.g., DHCP server 12) with IPv6 addresses of SLAAC clients.

For purposes of illustrating certain example techniques of communication system 10, it is important to understand the communications that may be traversing the network. The following foundational information may be viewed as a basis from which the present disclosure may be properly explained. IPv6 is a version of the Internet Protocol developed by the Internet Engineering Task Force (IETF) that is designed to replace Internet Protocol version four (IPv4). IPv6 includes many key enhancements to IPv4, including a much larger address space and improved routing protocols.

Computers that are connected to IP networks should be configured before they can communicate with other hosts. One piece of essential information needed for configuration is an IP address. There are several ways to assign IPv6 addresses including stateful (DHCP), stateless (SLAAC), and manual. When a computer uses a static IP address, it means that the computer is manually configured to use a specific IP address. One common problem with a manual or static assignment can result from benign or malicious user error or inattention to detail when two computers are configured with the same IP address. This can create a conflict that results in a loss of service. In addition, it can be time consuming and tedious to manually assign large groups of IP addresses.

DHCP eliminates the manual task assignment and, further, through the usage of one or more servers, provides a central database of devices that are connected to the network and that can eliminate duplicate resource assignments. When a DHCP-configured client (a computer or any other network-aware device) connects to a network, the DHCP client sends a broadcast query requesting necessary information from a DHCP server. The DHCP server manages a pool of IP addresses and information about client configuration parameters such as default gateway, domain name, the name servers, other servers such as time servers, etc. On receiving a valid request, the server assigns the client an IP address, a lease (length of time the allocation is valid), and other IP configuration parameters such as a subnet mask and a default gateway. The query is typically initiated immediately after booting and is completed before the client can initiate IP-based communication with other hosts.

Many network operators, service providers, enterprises, etc. (e.g., network operator 18) commonly use DHCP to assign IP addresses, as well as keep track of client devices (i.e., hosts 20a-e) by maintaining a database with mappings between client's IP addresses and device identifiers. In an example, network operators can manage 30M+ IP addresses assigned to 23M+ client devices that are receiving one or more IP-based services. To check the availability of any service for a particular client, a ping, traceroute, SNMP/Netflow, etc. may be sent to a particular device by using the IP address of the device, as defined in the database.

However, many network operators favor SLAAC because, using SLAAC, the IPv6 address assignment method is relatively simpler and scalable. In addition, SLAAC does not require clients to communicate with centralized configuration servers for address assignment, which reduces network overhead. Further, SLAAC is the only way to reduce the load on DHCP servers and, assuming privacy extensions [Request for Comments (RFC) 3041], the only way to increase security. In addition, SLAAC is ubiquitously supported by many current host operating systems (OSes), whereas many host OSes (e.g., WinXP, Apple MAC OS etc.) already in deployment still do not support other configuration protocols such as DHCPv6.

SLAAC, which is defined by RFC 4862 of the IETF, is a distributed address assignment process that enables network hosts to automatically configure interfaces when connected to an IPv6 network. Typically, the assignment mechanism involves a router instructing each host to use SLAAC, a host automatically generating an address for itself, verifying the uniqueness of the address, and assigning the address to the hosts interface identified by a unique device identifier (ID). Thus, SLAAC allows hosts to generate and assign their own IPv6 addresses with minimal configuration of routers and without manual configuration or additional servers. SLAAC client module 30 is configured to enable SLAAC functions.

Despite SLAAC's benefits, some network operators still rely on stateful configuration methods such as DHCP for host configuration because network operators cannot track or monitor (at the backend device management system) any SLAAC host by the host's IP address(es). As the network operators move to IPv6 and use SLAAC to assign the IPv6 address to the hosts, the operators right away lose the ability to maintain a database mapping of users' devices and IPv6 addresses.

In accordance with one example implementation, communication system 10 can be configured to maintain a database for its SLAAC clients (e.g., hosts 20a and 20e) and send the database information to servers (e.g., DHCP server 12 or backend device management systems) for tracking and monitoring usage. For example, using local database (e.g., address database 28) information at a switch or router (e.g., router 16a), a new DHCPv6 message and option may be used to track IPv6 address mappings for SLAAC clients and to update a server database per the DHCPv6 message and option sent by the router.

More specifically, a host relying on SLAAC may formulate an IPv6 address using IPv6 prefix information from a Router Advertisement (RA) message and send a Neighbor Solicitation (NS) message, as per a duplicate address detection (DAD) procedure [specified in RFC 4862]. In an embodiment, a router can recognize the NS message (pertaining to DAD) by its source IPv6 address being unspecified and, further, process the NS message to record the source Media Access Control (MAC) address (link-layer) and IPv6 address that is encoded in the temporary address field of the NS message. The router may maintain a local database to record a mapping of a MAC address and a corresponding one or more IPv6 addresses. In another embodiment, an interface identifier other than a MAC address may be used as the device ID. The interface identifier is useful when the host and router communicate using non-Ethernet Layer 2 protocol (e.g., HDLC, PPP, etc.).

If the router receives another NS message pertaining to DAD from the same host (i.e. same device ID) with a different temporary IPv6 address, then the router may update its database by either replacing the existing IPv6 address with the new one, if the "prefix" was the same for both addresses, or, if the "prefix" was different for both addresses, by appending the new IPv6 address to the existing one. For example, the new IPv6 address (or any portion thereof) may be linked, joined, associated with, or otherwise added to a database entry for an existing IPv6 address. The former would indicate that a previous DAD had possibly failed and the host has a new IP address, whereas the latter would indicate that the host obtained an additional IPv6 address. If the router already has an entry for the IPv6 address mapped to a different device ID, then the router may indicate the duplicate address usage. For example, the router may mark such an entry in the local database for possible deletion, and optionally, generate a warning for logging purposes (e.g., Simple Network Management Protocol (SNMP)).

Network operators may want the router to maintain the database only for the SLAAC clients, and not for the clients that obtained the IP prefix via other mechanisms. This could be controlled by a router configuration knob and by making the router check the target address's prefix to see if the address's prefix is local to the router and enabled for SLAAC usage. The router may periodically send one or more qualified entries from the local database to the server so that the designated servers can keep track of the clients, users, subscribers and their respective IPv6 addresses.

In an embodiment, the router may reduce the load on the server by sending only incremental changes if the router's local database is updated. For example, when one or more addresses of a host device needs purging from the server database, the router can set the 'lifetime' field of a sent message to zero while including zero or more IPv6 address in the message. If zero IPv6 addresses are included and the lifetime is zero, then the server could delete (or purge) the addresses associated with the specified client ID of the router from the server database. The router may use one (or more) DHCPv6 messages to carry one (or more) instances of the DHCP option, depending on the number of entries or mappings the router has in the database (subjected to the outgoing interface Maximum Transmission Unit (MTU) and the message size). The DHCPv6 message is intended to be sent by the router as an unsolicited message and the router does not expect a positive or negative response from the DHCPv6 server. In an embodiment, the router (e.g., router 16a) may use an existing message (e.g., DHCPv6 REBIND message) instead of a new message.

In terms of the infrastructure of the present disclosure, hosts 20a-e can be associated with clients, customers, endpoints, handheld devices, or end users wishing to initiate a communication in communication system 10 via some network. The term 'host' is inclusive of devices used to initiate a communication such as a receiver, a computer, a set-top box, an Internet radio device (IRD), a cell phone, a smart phone, a tablet, a personal digital assistant (PDA), a Google droid, an iPhone, iPad, or any other device, component, element, or object capable of initiating voice, audio, video, media, or data exchanges within communication system 10. Hosts 20a-e may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Network 14 represents a series of points or nodes of interconnected communication paths for receiving and transmitting packets of information that propagate through the architecture. Network 14 offers a communicative interface between sources and/or hosts, and each may be any local area network (LAN), wireless local area network (WLAN), metropolitan area network (MAN), Intranet, Extranet, WAN, virtual private network (VPN), or any other appropriate architecture or system that facilitates communications in a network environment. The architecture of the present disclosure may include a configuration capable of transmission control protocol/internet protocol (TCP/IP) communications for the transmission and/or reception of packets in a network. The architecture of the present disclosure may also operate in conjunction with a user datagram protocol/IP (UDP/IP) or any other suitable protocol, where appropriate and based on particular needs.

DHCP server 12, network operator 18, hosts 20a-e, and routers 16a and 16b are network elements that can facilitate the dynamic learning activities discussed herein. As used herein in this Specification, the term 'network element' is meant to encompass any of the aforementioned elements, as well as routers, switches, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, DHCP server 12, network operator 18, hosts 20a-e, and/or routers 16a and 16b include software to achieve (or to foster) the dynamic learning activities discussed herein. This could include the implementation of instances of address module 22 and/or SLAAC client module 30. Additionally, each of these elements can have an internal structure (e.g., a processor, a memory element, etc.) to facilitate some of the operations described herein. In other embodiments, these dynamic learning activities may be executed externally to these elements, or included in some other network element to achieve the intended functionality. Alternatively, DHCP server 12, network operator 18, hosts 20a-e, and/or routers 16a and 16b may include software (or reciprocating software) that can coordinate with other network elements in order to achieve the dynamic learning activities described herein. In still other embodiments, one or several devices may include any suitable algorithms, hardware, software, components, modules, interfaces, or objects that facilitate the operations thereof.

Figure 2A:
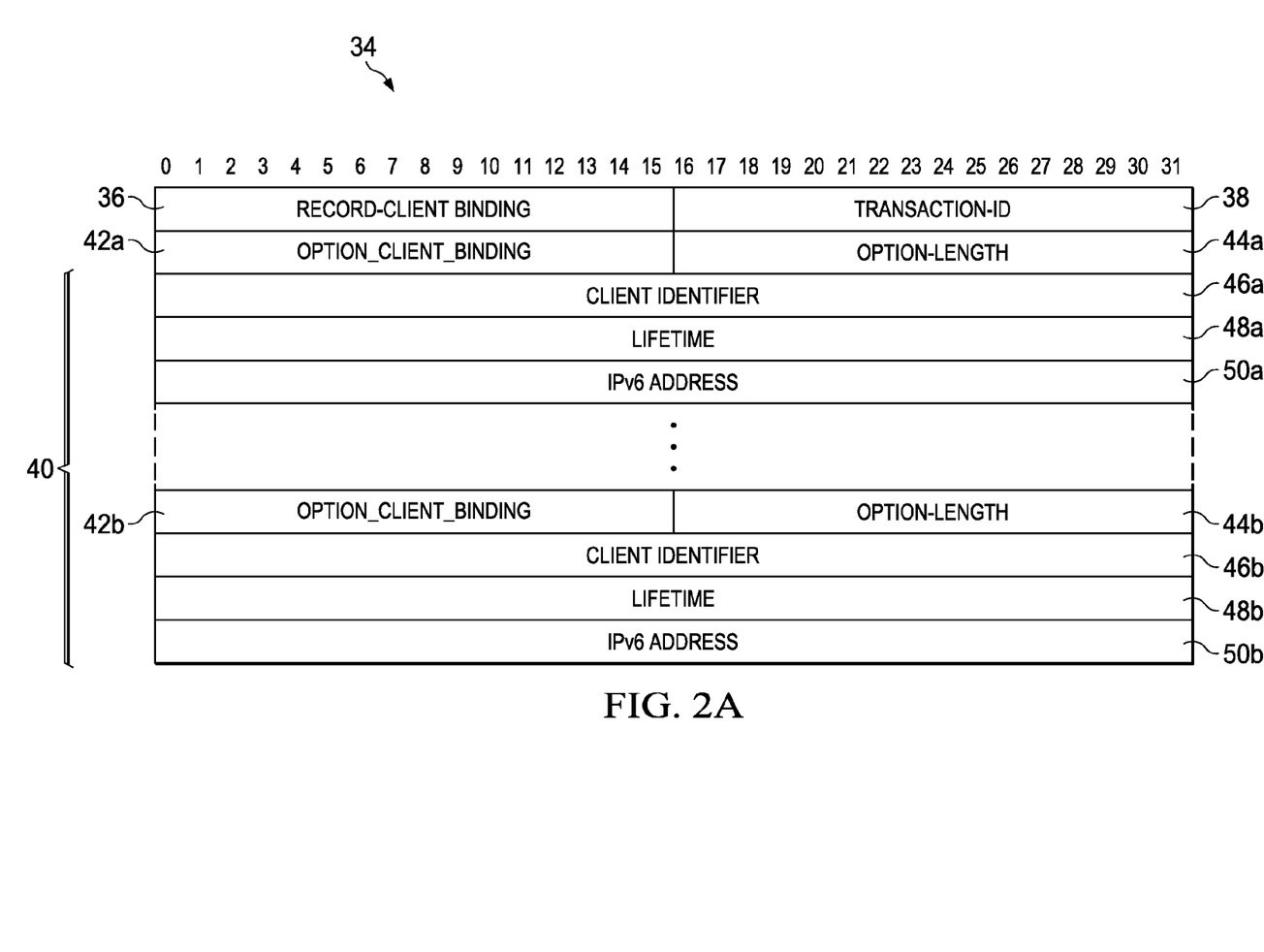
FIG. 2A is a simplified block diagram illustrating possible example details associated with the communication system in accordance with one embodiment of the present disclosure.

Turning to FIG. 2A, FIG. 2A is a simplified block diagram illustrating one possible set of details associated with a message 34 that may be used in communication system 10. Message 34 may be a new DHCPv6 message. FIG. 2A includes a record client binding section 36, a transaction-ID section 38, and a client binding options section 40. Client binding options section 40 includes option client binding sections 42a and 42b, option length sections 44a and 44b, client ID sections 46a and 46b, lifetime sections 48a and 48b, and IPv6 address sections 50a and 50b. In an embodiment, client binding options section 40 only includes option client binding section 42a, option length section 44a, client ID section 46a, lifetime section 48a, and IPv6 address section 50a. In one example, option client binding sections 42a-50a may include the mapping for a first client and option client binding sections 42b-50b may include the mapping for a second client.

In an embodiment, record client binding section 36 can include an Internet Assigned Numbers Authority (IANA) allocated ID for the new DHCPv6 message. Transaction-ID section 38 can include a transaction ID for the message exchange. Client binding option section 40 identifies at least one client. In an embodiment, there may be a plurality of clients identified in client binding option section 40.

Option client binding sections 42a and 42b can include an IANA allocated ID for the new DHCPv6 message. Option length sections 44a and 44b can include the length of the message. In an embodiment, the length may be in octets. For example, option length section 44a may include an option length for a first client and option length section 44b may include an option length for a second client.

Client ID sections 46a and 46b may include a DHCPv6 unique client ID (e.g., DUID based on a link-layer (DUID-LL) address). For example, client ID section 46a may include a first unique DHCPv6 client ID and client ID 46b may include a second unique DHCPv6 client ID. Lifetime sections 48a and 48b can include information about when the message will expire. For example, lifetime section 48a may include information about when the IPv6 address for the first client will expire and lifetime section 48b may include information about when the IPv6 address for the second client will expire. In an embodiment, if the IPv6 address for the first client is to be removed from DHCP server 12, then lifetime section 48a may be set to zero. IPv6 address sections 50a and 50b can include zero or more IPv6 addresses assigned to the same link-layer address (or interface identifier) of the client. For example, IPv6 address section 50a may include zero or more IPv6 addresses for a first client and IPv6 address section 50b may include zero or more IPv6 addresses for a second client.

Figure 2B:
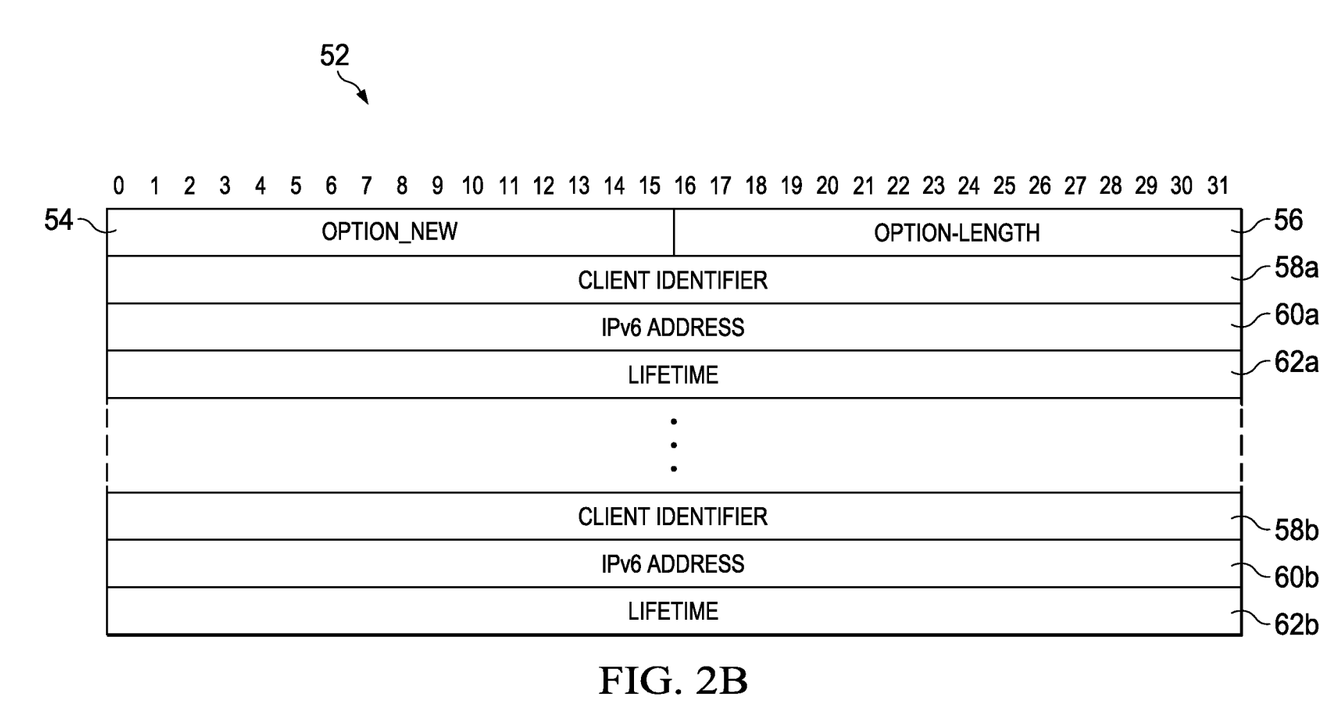
FIG. 2B is another simplified block diagram illustrating possible example details associated with the communication system in accordance with one embodiment of the present disclosure.

Turning to FIG. 2B, FIG. 2B is a simplified block diagram illustrating one possible set of details associated with a message 52 that may be used in communication system 10. Message 52 may be a modified DHCPv6 message containing a new option section 54, an option length section 56, client ID sections 58a and 58b, IPv6 address sections 60a and 60b, and lifetime sections 62a and 62b. Option new section 54 identifies the message as a modified DHCPv6 message and indicates that the system is proxying the message on behalf of a host that is not configured for DHCPv6.

Option length section 56 can include the length of the message. In an embodiment, the length may be in octets. Client ID 58a and 58b may include a DHCPv6 unique client ID (e.g., DUID based on a link-layer (DUID-LL) address). For example, client ID section 58a may include a first unique DHCPv6 client ID and client ID 58b may include a second unique DHCPv6 client ID. IPv6 address sections 60a and 60b can include zero or more IPv6 addresses assigned to the same link-layer address of the client. For example, IPv6 address section 60a may include zero or more IPv6 address for a first client and IPv6 address section 60b may include zero or more IPv6 address for a second client. Lifetime section 62a and 62b can include information about when the IPv6 address for a specific client will expire. For example, lifetime section 62a may include information about when the IPv6 address for the first client will expire and lifetime section 62b may include information about when the IPv6 address for the second client will expire. More specifically, if the IPv6 address for the first client is to be removed from DHCP server 12, then lifetime section 62a may be set to zero.

Figure 3:
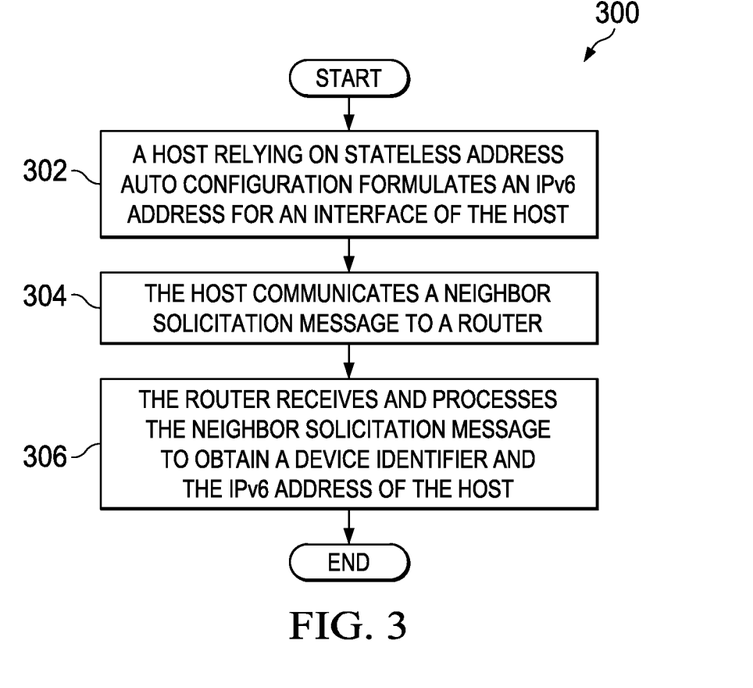
FIG. 3 a simplified flowchart illustrating potential operations associated with the communication system in accordance with one embodiment of the present disclosure.

FIG. 3 is a simplified flowchart 300 illustrating example activities of a router obtaining a device ID and an IPv6 address of a host. At 302, a host relying on SLAAC formulates an IPv6 address for an interface of the host. In an embodiment, the IPv6 address is formulated using IPv6 prefix information from a RA message. For example, using SLAAC, host 20a may formulate an IPv6 address. At 304, the host communicates an NS message to a router. In an embodiment, the NS message is communicated on the interface of the host. For example, host 20a may communicate an NS message to router 16a. At 306, the router receives and processes the NS message to obtain a device ID and the IPv6 address of the host. For example, router 16a may receive and process the NS message from host 20a to obtain a device ID and the IPv6 address of the host. In an embodiment, the device ID may be a MAC address. In another embodiment, a device ID other than a MAC address may be used (e.g., an interface identifier).

Figure 4:
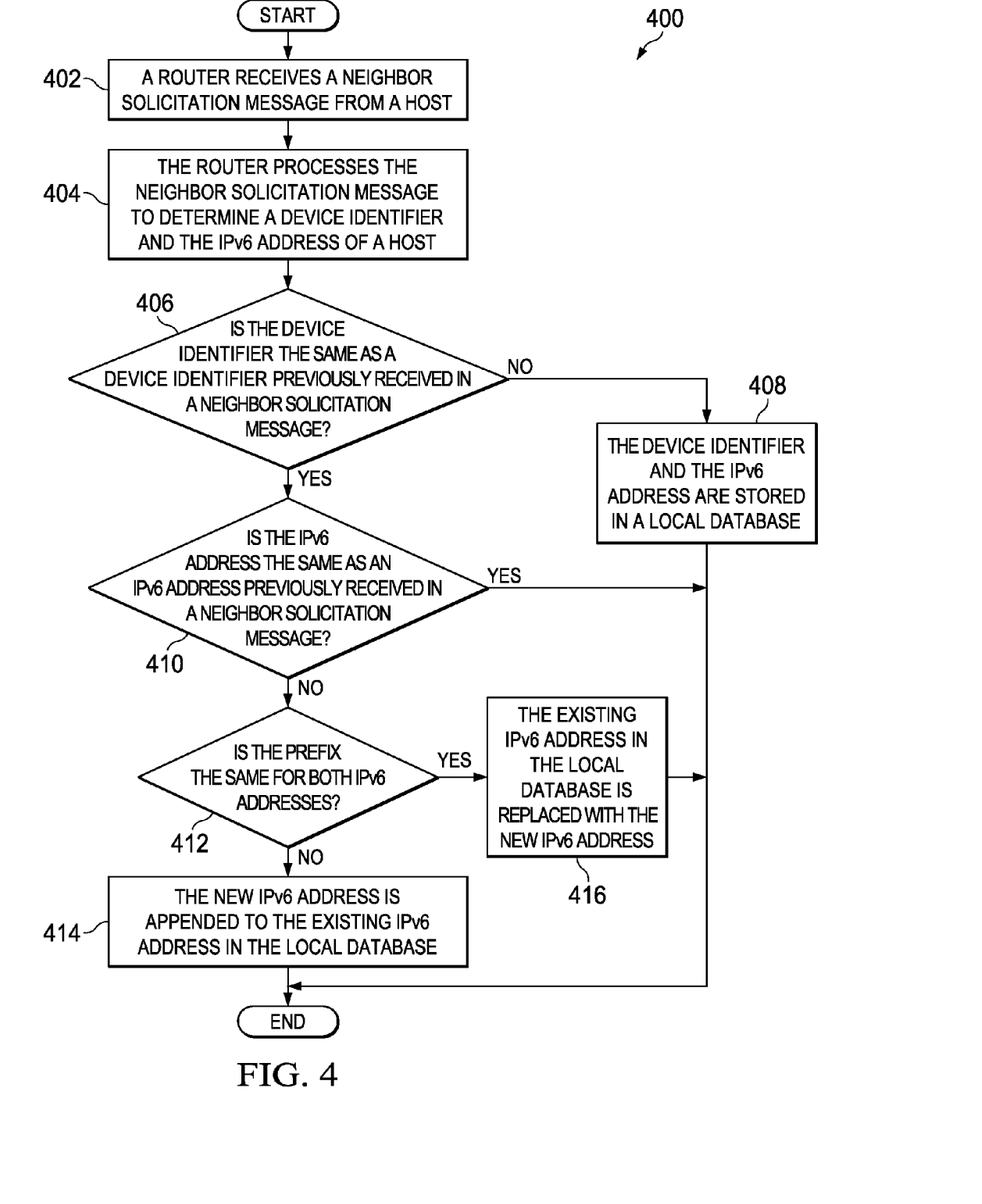
FIG. 4 is another simplified flowchart illustrating potential operations associated with the communication system in accordance with one embodiment of the present disclosure.

FIG. 4 is a simplified flowchart 400 illustrating example activities of maintaining a device ID and an IPv6 database in a router. At 402, a router receives an NS message from a host. For example, router 16a may receive an NS message from host 20a. At 404, the router processes the NS message to determine a device ID and the IPv6 address of the host. For example, router 16a may process the NS message to determine a device ID and the IPv6 address of host 20a. In an embodiment, the device ID may be a MAC address. In another embodiment, a device ID other than a MAC address may be used (e.g., an interface identifier). At 406, the system determines if the device ID is the same as a device ID previously received in an NS message.

If the device ID is not the same as a device ID previously received in an NS message, then the device ID and the IPv6 address are stored in a local database, as in 408. For example, the device ID and the IPv6 address may be stored in address database 28 (in address module 22) of router 16a. If the device ID is the same as a device ID previously received in an NS message, then the system determines if the IPv6 address is the same as an IPv6 address previously received in an NS message, as in 410. If the IPv6 address is the same as an IPv6 address previously received in an NS message, then the process ends.

If the IPv6 address is not the same as an IPv6 address previously received in an NS message, then the system determines if the prefix is the same for both IPv6 addresses, as shown in 412. If the prefix is not the same for both IPv6 addresses, then the new IPv6 address is appended to the existing IPv6 address in the local database, as in 414. For example, the new IPv6 address may be appended to the existing IPv6 address in address database 28. If the IPv6 address is the same for both IPv6 addresses, then the existing IPv6 address in the local database is replaced with the new IPv6 address, as in 416. For example, the existing IPv6 address in address database 28 may be replaced with the new IPv6 address.

Figure 5:
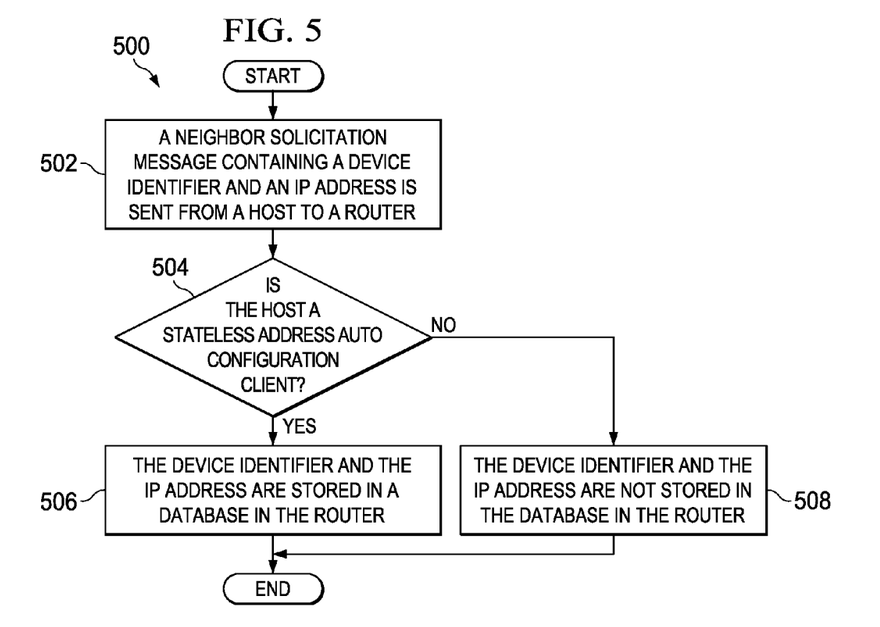
FIG. 5 is another simplified flowchart illustrating potential operations associated with the communication system in accordance with one embodiment of the present disclosure.

FIG. 5 is a simplified flowchart 500 illustrating example activities of maintaining SLAAC addresses in a database. At 502, an NS message containing a device ID and an IP address is sent from a host to a router. For example, a device ID and an IPv6 address for host 20a may be sent from host 20a to router 16a. In an embodiment, the device ID may be a MAC address. In another embodiment, a device ID other than a MAC address may be used (e.g., an interface identifier).

At 504, the system determines if the host is a SLAAC client. For example, address module 22 in router 16a may determine if host 20a is a SLAAC client by comparing the prefix of the address with one advertised in a RA message. If the host is a SLAAC client, then the device ID and the IPv6 address are stored in a database in the router, as in 506. For example, if host 20a is a SLAAC client, then the MAC address and the IPv6 address of host 20a may be stored in address database 28 of router 16a. If the host is not a SLAAC client, then the device ID and the IPv6 address may not be stored in a database in the router, as in 508.

Figure 6:
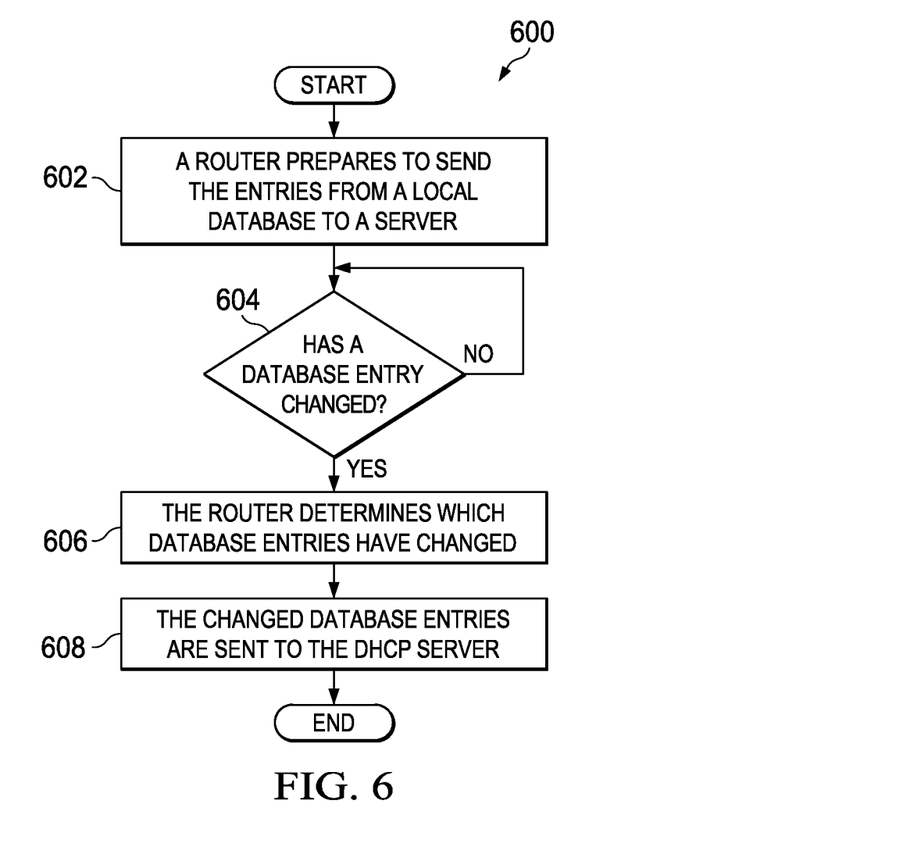
FIG. 6 is another simplified flowchart illustrating potential operations associated with the communication system in accordance with one embodiment of the present disclosure.

FIG. 6 is a simplified flowchart 600 illustrating example activities of dynamic learning by a server. At 602, a router prepares to send the entries from a local database to a server. The local database may be local to (and accessible by) the router. For example, the local database may be provisioned internally within the router (e.g., in a routing table format). In an embodiment, the server is a DHCP server. At 604, the system determines if a database entry has changed. For example, the system may determine if a database entry has changed by using a bit field of a packet, a flag, a status register, a hash result, etc. If a database entry has not changed, then the process returns to 604 to determine if a database entry has changed. If a database entry has changed, then the router determines which database entries have changed, as in 606. At 608, the changed database entries are sent to the server.

Figure 7:
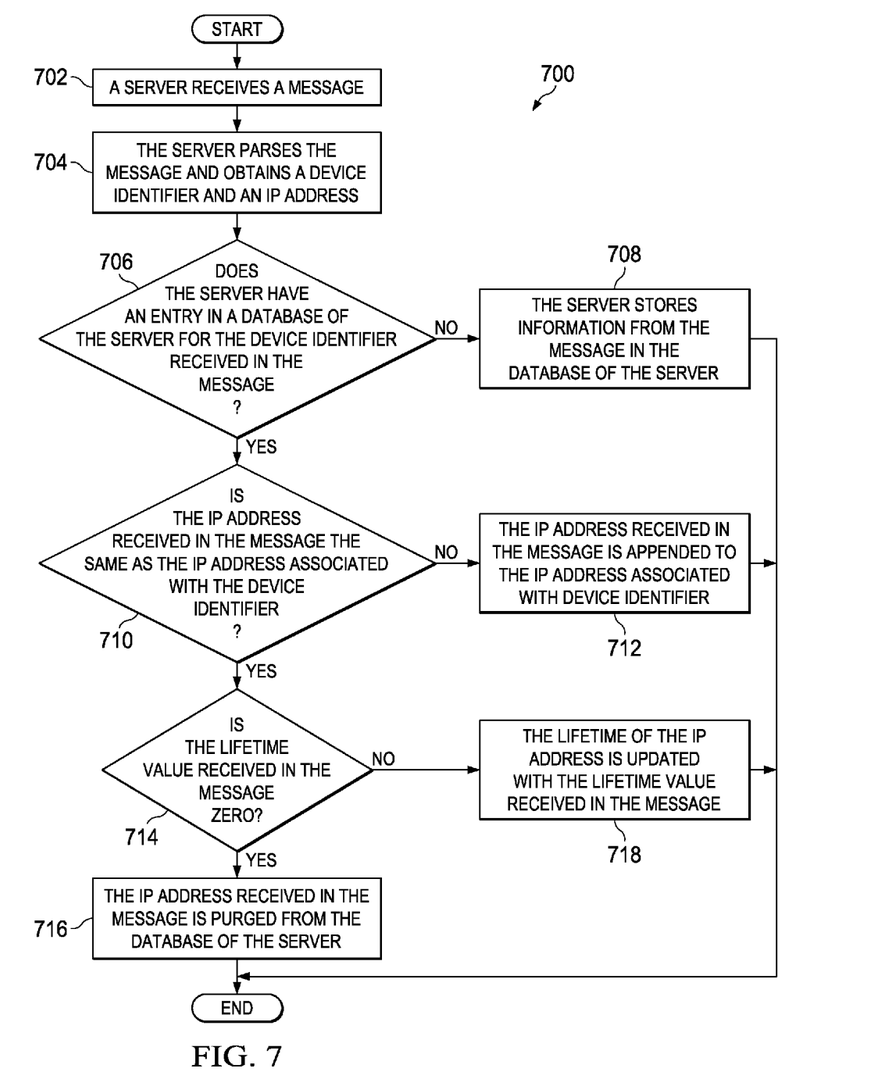
FIG. 7 is another simplified flowchart illustrating potential operations associated with the communication system in accordance with one embodiment of the present disclosure.

FIG. 7 is a simplified flowchart illustrating example activities of dynamic learning by a server. At 702, a server receives a message. In one embodiment, the message is a DHCPv6 message containing one or more options such that each option includes a mapping of a device ID (e.g., client ID) to one or more IPv6 addresses. The mapping represents a logical relationship between the device ID and the one or more IPv6 addresses. At 704, the server parses the message and obtains the device ID and an IPv6 address (or addresses). At 706, the system determines whether the server has an entry in a database of the server for the device ID received in the message. If the server does not have an entry in the database of the server for the device ID, then the server stores information from the message in the database of the server, as in 708. In an embodiment, the information from the message can include mapping between device ID and associated IPv6 addresses, a lifetime, etc.

If the server does have an entry in a database of the server for the device ID, then the system determines if the IPv6 address (or addresses) received in the message is the same as the IPv6 address associated with the device ID, as in 710. If the IPv6 address received in the message is not the same as the IPv6 address associated with the device ID, then the IPv6 address received in the message is appended to the IPv6 address associated with the device ID, as in 712. For example, the IPv6 address received in the message may be linked, joined, associated with, or otherwise added to a database entry for an existing IPv6 address associated with the device ID. If the IPv6 address received in the message is the same as the IPv6 address associated with the device ID, then the system determines if the lifetime value received in the message is zero, as in 714. The lifetime value is a packet field that indicates the lifetime during which the IPv6 address is a valid address. If the lifetime value received in the message is zero, then the IPv6 address received in the message is purged from the database of the server, as in 716. If the lifetime value received in the message is not zero, then the lifetime of the IPv6 address is updated (e.g., replaced) with the lifetime value received in the message, as in 718.

In case when a network device (e.g. router) reloads and becomes functional, the network device may send another message such as DHCP bulk leasequery to the server so as to retrieve all the mappings that the network device had advertised to the server prior to the failure of the network device. The server, upon receiving the message from the network device can locate all the mappings that the identified network device had previously sent and respond to the network device with those mappings. Note that unlike what's defined by IETF RFC 5460, a DHCP bulk leasequery message is by the network device, even if the network device is not a relay-agent and even if the mappings do not contain any delegated prefixes (i.e. PD prefixes).

Note that in certain example implementations, the dynamic learning functions outlined herein may be implemented in logic encoded in one or more non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1] can store data used for the operations described herein. This includes the memory element being able to store instructions (e.g., software, logic, processor instructions, etc.) that can be executed to carry out the activities described in this Specification. A processor (e.g., processors 24a and 24b shown in FIG. 1) can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, routers 16a and 16b and hosts 20a-e may include software in order to achieve the dynamic learning functions outlined herein. These activities can be facilitated by address module 22 and/or SLAAC client module 30 (where these modules can be suitably combined in any appropriate manner, which may be based on particular configuration and/or provisioning needs). Routers 16a and 16b and hosts 20a-e can include memory elements for storing information to be used in achieving the intelligent dynamic learning activities, as discussed herein. Additionally, routers 16a and 16b and hosts 20a-e may include a processor that can execute software or an algorithm to perform the dynamic learning operations, as disclosed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, performed by a network device, comprising:
    receiving a neighbor solicitation message from a stateless address configuration host;
    processing the neighbor solicitation message to obtain a device identifier and an internet protocol version six (IPv6) address;
    determining whether the device identifier and the IPv6 address satisfy a set of conditions;
    if a determination is made that the device identifier and the IPv6 address satisfy the set of conditions, storing a mapping between the device identifier and the IPv6 address in a database associated with the network device, wherein if a determination is made that a prefix for the IPv6 address is the same for a particular IP address stored in the database, the storing comprises replacing the particular IP address stored in the database with the IPv6 address, and if a determination is made that the prefix for the IPv6 address is not the same for the particular IP address stored in the database, the storing comprises appending the IPv6address to the particular IP address stored in the database; and
    sending the mapping in a new message to a server.

2. The method of claim 1, further comprising:
    evaluating the database in order to determine whether a particular IPv6 address is a duplicate; and
    marking an entry associated with the particular IPv6 address in the database for deletion.

3. The method of claim 1, further comprising:
    sending a message with a lifetime setting of zero along with a particular IP address to the server to purge the particular IP address from the server.

4. The method of claim 1, wherein the determining that the device identifier and the IPv6 address satisfy the set of conditions further comprises:
    determining that the device identifier is the same as a particular identifier stored in the database;
    determining that the IPv6 address is not the same as the particular IP address stored in the database.

5. The method of claim 1, further comprising:
    storing the device identifier and the IPv6 address in the database;
    determining that an entry in the database has changed; and
    sending the entry that has changed to a dynamic host configuration protocol (DHCP) server.

6. The method of claim 1, wherein the IPv6 address is generated using prefix information from a router advertisement message, and wherein a neighbor solicitation (NS) message is sent to a next network location in order to store the IPv6address.

7. Logic encoded in non-transitory media that includes code for execution and when executed by a processor operable to perform operations, comprising:
    receiving, at a network device, a neighbor solicitation message from a stateless address configuration host;
    processing the neighbor solicitation message to obtain a device identifier and an internet protocol version six (IPv6) address;
    determining whether the device identifier and the IPv6 address satisfy a set of conditions;
    if a determination is made that the device identifier and the IPv6 address satisfy the set of conditions, storing a mapping between the device identifier and the IPv6 address in a database associated with the network device, wherein if a determination is made that a prefix for the IPv6 address is the same for a particular IP address stored in the database, the storing comprises replacing the particular IP address stored in the database with the IPv6 address, and if a determination is made that the prefix for the IPv6 address is not the same for the particular IP address stored in the database, the storing comprises appending the IPv6address to the particular IP address stored in the database; and
    sending the mapping in a new message to a server.

8. The logic of claim 7, the operations further comprising:
    evaluating the database in order to determine whether a particular IPv6 address is a duplicate; and marking an entry associated with the particular IPv6 address in the database for deletion.

9. The logic of claim 7, the operations further comprising:
sending a message with a lifetime setting of zero along with a particular IP address to the server to purge the particular IP address from the server.

10. The logic of claim 7, wherein the determining that the device identifier and the IPv6 address satisfy the set of conditions further comprises:
determining that the device identifier is the same as a particular identifier stored in the database;
determining that the IPv6 address is not the same as a the particular IP address stored in the database.

11. The logic of claim 7, the operations further comprising:
storing the device identifier and the IPv6 address in the database;
determining that an entry in the database has changed; and
sending the entry that has changed to a dynamic host configuration protocol (DHCP) server.

12. The logic of claim 7, wherein the IPv6 address is generated using prefix information from a router advertisement message, and wherein a neighbor solicitation (NS) message is sent to a next network location in order to store the IPv6address.

13. A network element, comprising:
a memory element;
a processor operable to execute instructions associated with code; and
an address module operable to interface with the processor such that the network element is configured for:
receiving a neighbor solicitation message from a stateless address configuration host;
processing the neighbor solicitation message to obtain a device identifier and an internet protocol version six (IPv6) address;
determining whether the device identifier and the IPv6 address satisfy a set of conditions;
if a determination is made that the device identifier and the IPv6 address satisfy the set of conditions, storing a mapping between the device identifier and the IPv6 address in a database associated with the network element, wherein if a determination is made that a prefix for the IPv6 address is the same for a particular IP address stored in the database, the storing comprises replacing the particular IP address stored in the database with the IPv6 address, and if a determination is made that the prefix for the IPv6 address is not the same for the particular IP address stored in the database, the storing comprises appending the IPv6address to the particular IP address stored in the database; and
sending the mapping in a new message to a server.

14. The network element of claim 13, wherein the network element is further configured for:
sending a message with a lifetime setting of zero along with a particular IP address to the server to purge the particular IP address from the server.

15. The network element of claim 13, wherein the determining that the device identifier and the IPv6 address satisfy the set of conditions comprises the network element being further configured for:
determining that the device identifier is the same as a particular identifier stored in the database; and
determining that the IPv6 address is not the same as the particular IP address stored in the database.

16. The network element of claim 13, wherein the network element is further configured for:
storing the device identifier and the IPv6 address in the database;
determining that an entry in the database has changed; and
sending the entry that has changed to a dynamic host configuration protocol (DHCP) server.

17. The network element of claim 13, wherein the IPv6 address is generated using prefix information from a router advertisement message, and wherein a neighbor solicitation (NS) message is sent to a next network location in order to store the IPv6 address.

18. A method, comprising:
receiving a message at a Dynamic Host Configuration Protocol (DHCP) server that includes a mapping between a device identifier and an Internet Protocol version six (IPv6) address, wherein the message is associated with a stateless address configuration host, wherein the message is sent to the DHCP server if a determination is made that the device identifier and the IPv6 address satisfy a set of conditions, and wherein if a determination is made that a prefix for the IPv6 address is the same for a particular IP address stored in a database associated with the stateless address configuration host, the message being sent comprises sending the IPv6 address as a replacement for the particular IP address, and if a determination is made that the prefix for the IPv6 address is not the same for the particular IP address stored in the database, the message being sent comprises sending the IPv6 address appended to the particular IP address; and
storing the mapping between the device identifier and the IPv6 address at the DHCP server.

19. The method of claim 18, further comprising:
tracking usage statistics associated with a plurality of stateless address configuration hosts, wherein for each of the plurality of stateless address configuration hosts, a respective mapping between a particular device identifier and a particular IPv6address is stored.

20. The method of claim 18, wherein a neighbor solicitation message from the stateless address configuration host is used to obtain the device identifier and the IPv6 address.

21. The method of claim 20, wherein the neighbor solicitation message is sent via a router that received the neighbor solicitation message from the stateless address configuration host.

22. The method of claim 18, further comprising:
receiving an unsolicited message from a particular router; and
evaluating the unsolicited message for one or more DHCP options associated with a particular mapping for a particular IPv6 address.

23. The method of claim 18, further comprising:
removing the IPv6 address from the DHCP server when the message includes a lifetime setting of zero within a particular packet.

24. The method of claim 18, further comprising:
evaluating a particular IPv6 address in order to determine whether it is a duplicate; and
marking an entry associated with the particular IPv6 address for deletion.

25. Logic encoded in non-transitory media that includes code for execution and when executed by a processor operable to perform operations, comprising:
receiving a message at a Dynamic Host Configuration Protocol (DHCP) server that includes a mapping between a device identifier and an Internet Protocol version six (IPv6) address, wherein the message is associated with a stateless address configuration host, wherein the message is sent to the DHCP server if a determination is made that the device identifier and the IPv6 address satisfy a set of conditions, and wherein if a determination is made that a prefix for the IPv6 address is the same for a particular IP address stored in a database associated with the stateless address configuration host, the message being sent comprises sending the IPv6 address as a replacement for the particular IP address, and if a determination is made that the prefix for the IPv6 address is not the same for the particular IP address stored in the database, the message being sent comprises sending the IPv6 address appended to the particular IP address; and storing the mapping between the device identifier and the IPv6 address at the DHCP server.

26. The logic of claim 25, the operations further comprising:
tracking usage statistics associated with a plurality of stateless address configuration hosts, wherein for each of the plurality of stateless address configuration hosts, a respective mapping between a particular device identifier and a particular IPv6address is stored.

27. The logic of claim 25, wherein a neighbor solicitation message from the stateless address configuration host is used to obtain the device identifier and the IPv6 address.

28. The logic of claim 27, wherein the neighbor solicitation message is sent via a router that received the neighbor solicitation message from the stateless address configuration host.

29. The logic of claim 25, the operations further comprising:
receiving an unsolicited message from a particular router; and
evaluating the unsolicited message for one or more DHCP options associated with a particular mapping for a particular IPv6 address.

30. The logic of claim 25, the operations further comprising:
removing the IPv6 address from the DHCP server when the message includes a lifetime setting of zero within a particular packet.

31. The logic of claim 25, the operations further comprising:
evaluating a particular IPv6 address in order to determine whether it is a duplicate; and
marking an entry associated with the particular IPv6 address for deletion.

32. An apparatus, comprising:
a memory element;
a processor operable to execute instructions associated with code such that the apparatus is configured for:
receiving a message at the apparatus that includes a mapping between a device identifier and an Internet Protocol version six (IPv6) address, wherein the message is associated with a stateless address configuration host, wherein the message is sent to the apparatus if a determination is made that the device identifier and the IPv6 address satisfy a set of conditions, and wherein if a determination is made that a prefix for the IPv6 address is the same for a particular IP address stored in a database associated with the stateless address configuration host, the message being sent comprises sending the IPv6 address as a replacement for the particular IP address, and if a determination is made that the prefix for the IPv6 address is not the same for the particular IP address stored in the database, the message being sent comprises sending the IPv6 address appended to the particular IP address; and storing the mapping between the device identifier and the IPv6 address at the apparatus.

33. The apparatus of claim 32, wherein the apparatus is further configured for:
tracking usage statistics associated with a plurality of stateless address configuration hosts, wherein for each of the plurality of stateless address configuration hosts, a respective mapping between a particular device identifier and a particular IPv6address is stored.

34. The apparatus of claim 32, wherein the apparatus is further configured for:
receiving an unsolicited message from a particular router; and
evaluating the unsolicited message for one or more DHCP options associated with a particular mapping for a particular IPv6 address.

35. The apparatus of claim 32, wherein the apparatus is further configured for:
removing the IPv6 address from the memory element of the apparatus when the message includes a lifetime setting of zero within a particular packet.

* * * * *